(12) United States Patent
Balsamello

(10) Patent No.: US 11,676,516 B2
(45) Date of Patent: Jun. 13, 2023

(54) AIRCRAFT LOCKOUT / TAGOUT FOR PUSHBUTTON SWITCH

(71) Applicant: Christopher M. Balsamello, Bridgewater, NJ (US)

(72) Inventor: Christopher M. Balsamello, Bridgewater, NJ (US)

( * ) Notice: Subject to any disclaimer, the term of this patent is extended or adjusted under 35 U.S.C. 154(b) by 92 days.

(21) Appl. No.: 17/410,034

(22) Filed: Aug. 24, 2021

(65) Prior Publication Data
US 2023/0067957 A1    Mar. 2, 2023

(51) Int. Cl.
| | |
|---|---|
| *H01H 3/20* | (2006.01) |
| *G09F 3/16* | (2006.01) |
| *H01H 13/10* | (2006.01) |
| *H01H 13/14* | (2006.01) |
| *B64D 43/00* | (2006.01) |

(52) U.S. Cl.
CPC .............. *G09F 3/16* (2013.01); *B64D 43/00* (2013.01); *H01H 3/20* (2013.01); *H01H 13/10* (2013.01); *H01H 13/14* (2013.01)

(58) Field of Classification Search
CPC .......... H01H 9/22; H01H 9/282; H01H 15/02; H01H 2071/565; H01H 3/20; H01H 13/10; H01H 13/14; H01H 9/283; H01H 9/286; H01H 9/287; H01H 13/023; H01H 15/06; H01H 2003/024; H01H 2071/046; H01H 2221/068; H01H 23/146; H01H 3/022; H01H 5/045; H01H 71/0264; H01H 71/04; H01H 71/126; H01H 73/08; G09F 3/16; B64D 43/00
See application file for complete search history.

(56) References Cited

U.S. PATENT DOCUMENTS

| | | | | |
|---|---|---|---|---|
| 4,013,856 | A * | 3/1977 | Joss | H01H 15/06 200/345 |
| 4,532,680 | A * | 8/1985 | Hashimoto | B42F 1/02 24/67.5 |
| 4,704,504 | A * | 11/1987 | Jones | H01H 13/14 200/520 |
| 2015/0342313 | A1 * | 12/2015 | Antinone | B42F 1/08 24/67.7 |
| 2016/0079009 | A1 * | 3/2016 | Weaver | H01H 9/286 200/43.21 |

* cited by examiner

*Primary Examiner* — Ahmed M Saeed
(74) *Attorney, Agent, or Firm* — Ernest D. Buff & Associates, LLC; Ernest D. Buff

(57) ABSTRACT

An engageable lockout and tagout device for aircraft pushbutton switches prevents attempts to electrically engage a corresponding control panel circuit of a system under service. The lockout and tagout device is configured to lock different pushbutton switch types present in a flight deck, including Korry switches, thereby preventing operators from actuating switches and alerting them that the switches have been disengaged.

31 Claims, 14 Drawing Sheets

AIRCRAFT LOCKOUT / TAGOUT FOR PUSHBUTTON SWITCH

BACKGROUND OF THE INVENTION

Field of the Invention

This invention relates generally to the de-energizing circuits in an aircraft; and, more particularly, to lockout/tag-out of circuit push buttons in an aircraft.

Description of the Prior Art

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

The U.S. Occupational Safety and Health Administrations' ("OSHA") Control of Hazardous Energy (Lock-Out/Tag-Out) ("LOTO") standards, Title 29 Code of Federal Regulations (CFR) Parts 1910.147, 1019.333, requires employees that perform work inside of an electrical panel to de-energize live parts of a circuit to which an employee may be exposed before the employee works on or near them. This standard applies to employees that service machines and equipment in which an unexpected energization or start-up of the machines or equipment, or release of stored energy, could harm the employee.

Under the LOTO standards, a person servicing, for example, electrically-powered machines or equipment is required to disengage a circuit breaker coupled to the component and apply a locking or "lockout" device to the breaker to prevent the circuit breaker from inadvertently engaging while the component is being serviced. Further, in order to comply with LOTO standards, the lockout device must not be capable of being removed from the circuit breaker except by undue force or the use of tools.

In addition to being de-energized and locked out, such equipment and/or circuits must be physically tagged at all points of work where the equipment or circuits can be energized. These tags are signs with warnings on them, such as "DO NOT OPERATE," "DANGER," or EQUIPMENT LOCKED OUT," that are tied to points where the equipment or circuits can be energized. Such tags must be physically attached to the inoperative equipment and circuits such that the tags may be seen in plain sight. The tags must also identify the equipment or circuits currently being serviced and, in some instances, the tags identify the personnel working on the equipment or circuit being serviced.

In applying the LOTO standards to the aviation industry, for example, certain circuits must be disengaged before a technician may service equipment or circuits coupled to the circuit. Once the circuit is disengaged, a physical lockout device must be physically secured to the circuit to prevent the circuit from being re-engaged. Thus, in the aviation industry, "lockout" devices may be located at the circuit breaker, which means they are hidden from sight by personnel in the flight deck or otherwise in the aircraft at the pushbutton or other switch used to engage the circuit in normal operation. As such, unless maintenance personnel have taken steps to apply a tag to the appropriate pushbutton (or other switch) in the flight deck, personnel there may still attempt to engage a system by depressing its corresponding flight deck pushbutton. However, even depressing the pushbutton for a circuit currently locked out can still result in a current or voltage discharge at the circuit breaker, potentially harming maintenance personnel. Or, in some instances, maintenance personnel will remove the lockout on the circuit breaker, re-engaging the system, leaving the personnel susceptible to current or voltage discharge by someone untimely pressing the pushbutton for that system. This physical separation and isolation between the lockout device at the circuit breaker and the tagout indicator in a flight deck can result in errors, possible on-the-job injuries, and reported violations from the Federal Aviation Administration (FAA).

There accordingly exists a need for a more effective aircraft lockout/tagout approach for the aviation industry.

SUMMARY OF THE INVENTION

The present invention includes novel techniques, including devices and methods, for providing combined lockout and tagout devices, in particular, devices that provide both functionality at locations remote from the system or other circuit being dis-engaged. In examples applied to the aviation industry, the present techniques provide lockout/tagout devices for pushbuttons and other actuators, such as those located at control panels, including those in a flight deck. These devices allow maintenance personnel to physically lockout/tagout a pushbutton, preventing anyone from depressing the pushbutton and engaging, or attempting to engage, the corresponding system, circuit, or circuit breaker. The ability to provide both lockout and tagout at the pushbutton allows a control panel to be maintained in an energized state, e.g., for testing or maintenance of critical flight deck operation while avoiding the possibility of energizing a remote circuit or circuit breaker electrically connected to that control panel. In various examples, the devices include attachment ends that are adjustable using spring loading to attach to pushbuttons and where the devices are prevented from inadvertent removal. Deployed into a lockout/tagout position, these devices further provide a protection wall that blocks an operator from depressing the pushbutton and a tag indicating that the pushbutton is offline for servicing.

In an embodiment of the invention there is provided a pushbutton lockout clip for a circuit on an aircraft panel wherein the circuit has a pushbutton switch for opening and closing the circuit in response to depression of the pushbutton switch, and the pushbutton lockout clip comprises: (i) an attachment end having a retaining clamp defining a lockout protection wall extending between opposing engagement walls of the clamp, each engagement wall extending from a distal end of the clamp, the opposing engagement walls each being configured to clamp respective inner engagement surfaces to outer surfaces of the pushbutton switch or to outer surfaces of a switch frame surrounding at least a portion of the pushbutton switch, in a lockout/tagout position of the clip; and (ii) a spring loaded clip end rotatably connected to the attachment end, the spring loaded clip end configured to rotate the attachment end between a release position and the lockout/tagout position, wherein in the lockout/tagout position the opposing engagement walls sufficiently cover the outer surfaces of the switch or the outer surfaces of the pushbutton switch to retain the pushbutton switch against depression.

In another embodiment, the protection wall comprises a first protection wall end and a second protection wall end. In this embodiment, one of the opposing engagement walls extends from the first protection wall end at a substantially 90° angle and wherein the other of the opposing engagement walls extends from the second protection wall end at a substantially 90° angle. With this embodiment, one of the opposing engagement walls extends from the first protection wall end at less than a 90° angle and wherein the other of the opposing engagement walls extends from the second protection wall end at less than a 90° angle.

In some embodiments, the spring-loaded clip end is configured to rotate the first protection wall end and the second protection wall end into a planar engagement in the lockout/tagout position.

In certain embodiments, the spring-loaded clip end is configured to rotate the first protection wall end and the second protection wall end into an articulated, non-planar engagement in the lockout/tagout position.

In some embodiments, the opposing engagement walls have a first length and the first and second protection walls have a second length, wherein the ratio of the first length to the second length is less than 1.

In further embodiments, the attachment end and the spring-loaded clip end are formed of the same material. In some embodiments, the attachment end and the spring-loaded clip end are formed of a different material.

In some embodiments, the attachment end and the spring-loaded clip end are formed of chrome-plated aluminum, hardened steel, spring steel, or resin. In further embodiments, the attachment end and the spring-loaded clip end are anodized and/or reflective.

In certain embodiments, the attachment end and the spring-loaded clip end are connected by a spring-engaged hinge pin.

BRIEF DESCRIPTION OF THE DRAWINGS

The invention will be more fully understood, and further advantages will become apparent when reference is had to the following detailed description of the preferred embodiments of the invention and the accompanying drawing, in which.

DETAILED DESCRIPTION OF THE INVENTION

The disclosure provides devices and methods for making combined lockout and tagout devices that provide improved functionality at locations remote from the system or other circuits being disengaged for maintenance. Various embodiments herein are described in reference to the aviation industry, where the present techniques, in various embodiments, provide lockout/tagout devices for pushbuttons such as those located on a control panel in a flight deck or other parts of an aircraft. These devices allow maintenance personnel to physically lockout/tagout a pushbutton, preventing anyone from depressing the pushbutton and engaging, or attempting to engage, the corresponding system or circuit.

In various embodiments, the devices include attachment ends that are adjustable using spring loading to attach to pushbuttons and where the devices are prevented from inadvertent removal. Deployed into a lockout/tagout position, these devices further provide a protection wall that blocks an operator from depressing the pushbutton and a tag indicating that the pushbutton is offline for servicing. In some embodiments, the devices include lockout clips that are configured for slidable engagement onto the pushbutton or into a pushbutton switch housing and provide a physical barrier against depression by virtue of that slidable engagement.

In some embodiments, the present techniques provide a pushbutton lockout clip for a circuit on an aircraft panel, where the circuit has a corresponding pushbutton switch for opening and closing the circuit in response to an operator depressing the pushbutton switch. In certain embodiments, the pushbutton lockout clip includes an attachment end having a retaining clamp defining a lockout protection wall extending between opposing engagement walls of the clamp, each engagement wall extending from a distal end of the clamp. These opposing engagement walls are configured to clamp their respective inner engagement surfaces to outer surfaces of the pushbutton switch or to outer surfaces of a switch frame surrounding at least a portion of the pushbutton switch. Such engagement, which may be considered a slidable engagement, enables lockout of the pushbutton. In some embodiments, the pushbutton lockout clip further includes a spring-loaded clip end rotatably connected to the attachment end, and the spring-loaded clip end may be configured, for example, to rotate the attachment end between a release (or non-lockout/tagout) position and a lockout/tagout position. In the lockout/tagout position, the opposing engagement walls sufficiently cover the outer surfaces of the switch or the outer surfaces of the pushbutton switch to retain the pushbutton switch against depression.

Figure 1:
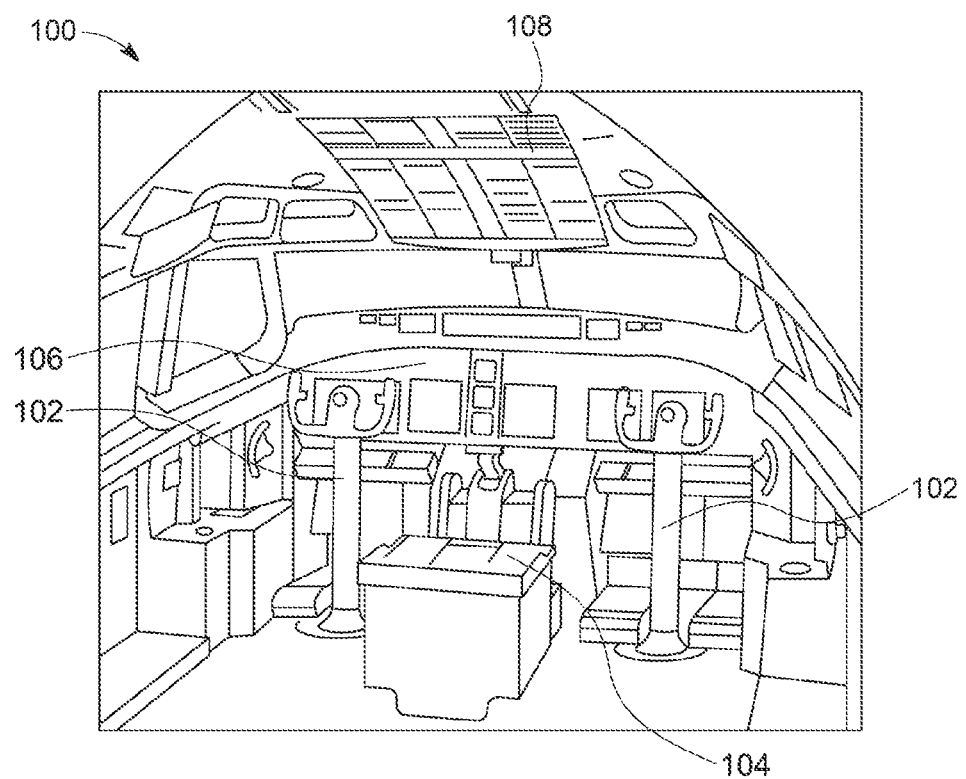
FIG. 1 is a perspective view of a flight deck of an aircraft, showing a control panel, in accordance with an embodiment of the invention.

In FIG. 1 there is shown generally at 100 an aircraft flight deck. Flight deck 100 may be utilized with any flyable aircraft, such as an airplane, helicopter, airship, glider, and the like. The illustrated embodiment is of a piloted aircraft. In other embodiments, the techniques herein may be implemented on partially or fully remotely controlled aircraft, such as drones or other aircraft that include a control area within the aircraft that requires maintenance. Furthermore, while embodiments are described in reference to a flight deck and corresponding control panels, the present techniques may be implemented on any suitable pushbutton controls on an aircraft which may be located in other locations in the aircraft, whether those pushbuttons are used for aircraft or non-aircraft operations.

Generally stated, flight deck 100 includes access areas for operators, e.g., pilots, and controls for flight control, flight guidance, navigation, communication, and other functions. These controls may include electronic pneumatic, optical and other controls, as well as control interfaces, through which the operators can input instructions. Such control interfaces include physical controllers such as throttle control systems 104 for controlling the movement of flaps, engines, and other systems of the aircraft. These controls include switches, including pushbutton switches, and digital displays, with or without haptic feedback. The digital displays provide an operator with system information on the aircraft and flight information, such as attach angle, altitude, airspeed, fuel consumption, navigation maps, distance, and the like.

In the embodiment illustrated, flight deck 100 includes a control panel 104, a forward instrument panel 106, and an overhead switch panel 108. The control panel 104 (or control console) may include communication panels, air data computers, engine fuel valve controls, throttle controls, flap level controls, brake controls, transponder, etc. The forward instrument panel 106 may include digital displays, such as the primary flight display, navigation display, engine and crew alarm displays, airspeed indicators, system displays, and the like. Any of these panels may be electronically energized by circuits with various types of pushbuttons used for activation. Further, while example instrument panels are illustrated, the present techniques may be used in any number of other panels and pushbutton switches throughout an aircraft, such as flight attendant panels. In some examples, panels are covered with a metal plate with openings for each of the various pushbuttons. Indeed, the present techniques allow for locking and tagging of pushbuttons that extend above the upper surface of an instrument panel in their disengaged position, as well as that of pushbuttons that are flush with the upper surface of an instrument panel or that are recessed below the upper surface in their disengaged position. The lockout clips herein are able to lock any such pushbuttons from being depressed into their engaged position. In some embodiments, panels include a light plate to illuminate the panel and pushbuttons therein. The lockout clips may be used with pushbuttons that have cover guards, which can be flipped up to allow access to the pushbutton or frame for attachment of the lockout clip. The present techniques provide for lockout clips compatible with these and other panel types. Further, the lockout clips may be sized for use on both pushbuttons and non-pushbutton actuators in a flight deck, such as having lockout clips sized to be attached to throttle arms of the flight deck 100.

Figure 2:
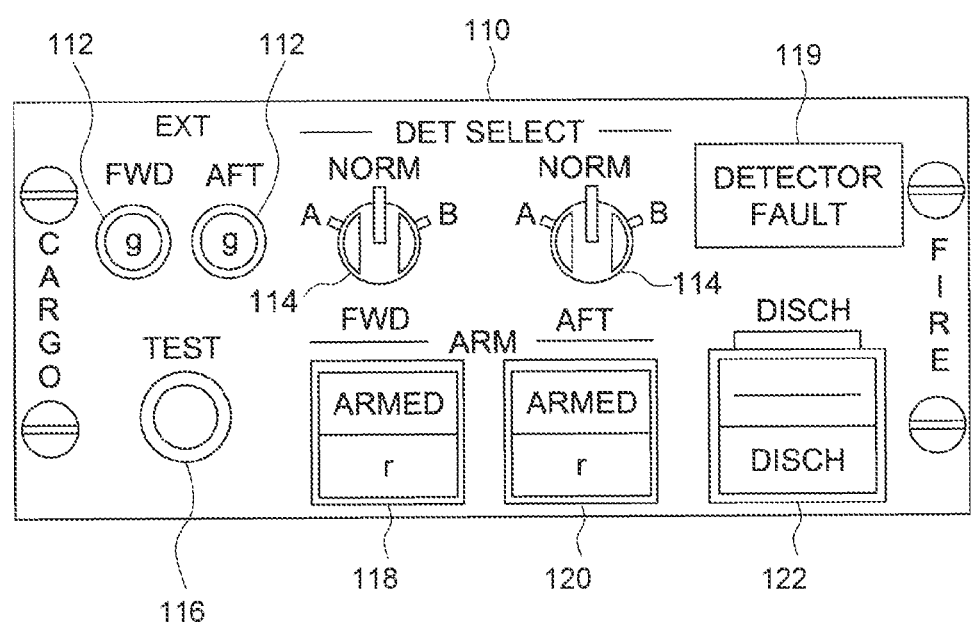
FIG. 2 depicts a top of an embodiment of a cargo fire panel of the control panel of FIG. 1.

In FIG. 2 there is illustrated a cargo fire panel 110 for the control panel 104. Panel 110 includes forward compartment (FWD) and after compartment (AFT) extinguisher test lights 112, detector select switches in the form of knobs 114, a detector fault light 119, a cargo fire TEST pushbutton switch 116, and three Korry switches. The Korry switches include switches 118 and 120, for the forward and aft extinguishers of the forward and aft cargo compartments, respectively. Each of the switches 118 and 120 may include respective warning lights. The Korry switches also include a discharge switch 122 with a light indicator. In some embodiments, various switches herein (e.g., the discharge switch 122) may include a flappable switch cover. Advantageously, embodiments herein provide for locking out pushbutton switches while those switches are maintained with electrical power. This allows, for example, locking out pushbutton switches that are powered and illuminated, such as the discharge switch 122.

The switches 118, 120, and 122 are example pushbutton switches that control electrical engagement and disengagement of circuits connected to each for controlling systems remote from the panel and thus from these pushbuttons. In the illustrated embodiment of FIG. 2, these switches can be used to control the discharge of forward and aft compartment fire extinguishers. A flight deck may have many control panels and, as a result, may have tens to hundreds of pushbuttons and other switches, each connected to a dedicated circuit or other control circuit. In operation, each switch is used to control a different system on an aircraft, including flight control systems such as flaps and sensors, safety systems such as extinguishers, communication systems, engine and crew alarm displays, and the like.

Whereas during operation, pushing the switches 118, 120, and 122 engages a corresponding circuit, during maintenance, it is desired to prevent engagement of a circuit, to allow maintenance personnel to operate on the circuit, on the underlying system, and/or on control panels without being exposed to high energy (current or voltage) energy sources. As noted above, lockout/tagout procedures are in place to protect personnel from circuit discharge during maintenance. Whereas conventional techniques performed lockout at the circuit or by complex locking pin devices at the pushbutton, the present techniques provide dual lockout and tagout operation by locking panel switches from operation and tagging these switches with a physical tag so that personnel inside the aircraft know that the circuit breakers and/or systems associated with the switch are under maintenance.

Figure 3:
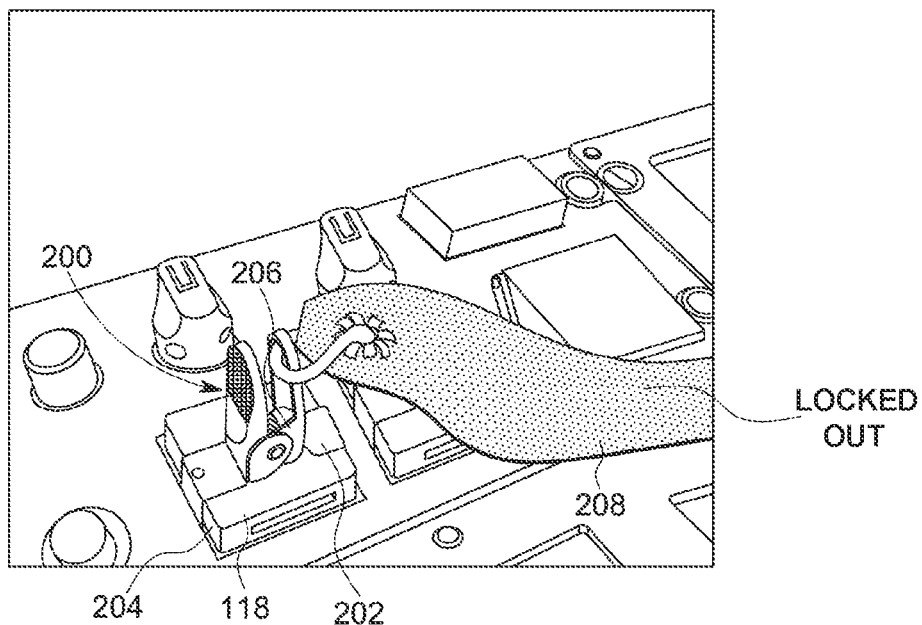
FIG. 3 is a perspective view of the cargo file panel of FIG. 2 showing a pushbutton lockout clip engaged in a first lockout/tagout position.
Figure 4:
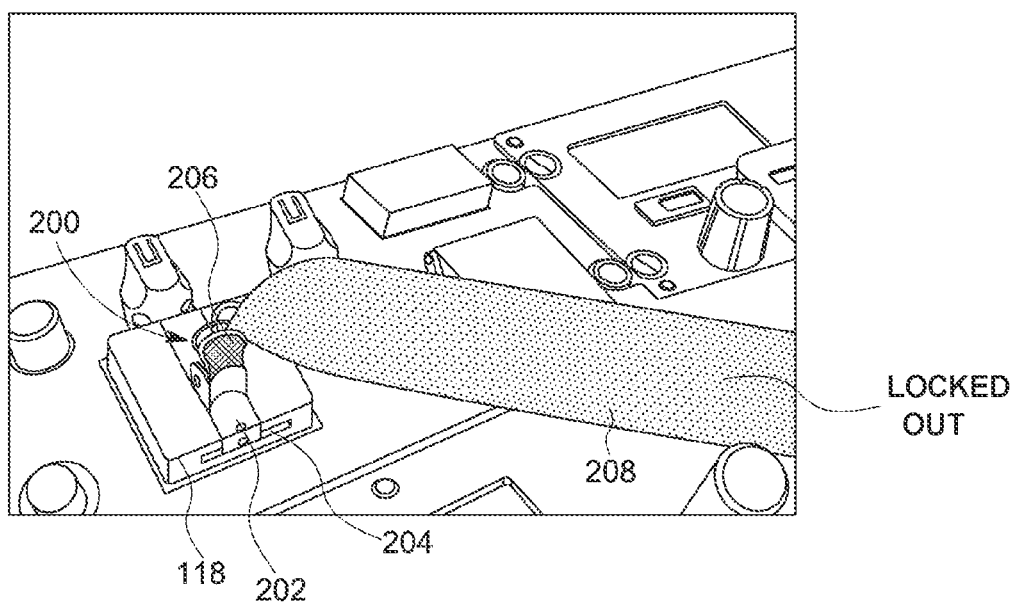
FIG. 4 is a perspective view of the cargo fire panel of FIG. 2 showing a pushbutton lockout clip engaged in a second lockout/tagout position.

In various embodiments of the present invention, a circuit pushbutton lockout clip prevents engagement of circuits and systems during maintenance by providing externally applied lockout clips that may be used on any number of different switches. FIGS. 3 and 4 illustrate the control panel 110 with a pushbutton lockout clip 200 that has been affixed to the FWD compartment ARMED extinguisher pushbutton 118, providing lockout functionality that prevents personnel from engaging the pushbutton and providing tagout functionality by giving a visual indication to personnel that the pushbutton is unavailable for use. In the illustrated embodiment, the lockout clip 200 is configured to provide lockout engagement of the pushbutton 118 in different orientations. In operation, personnel can determine their preferred orientation for easy attachment and removal and affix the lockout clip 200 to the pushbutton 118 accordingly. FIG. 3 illustrates a lateral engagement, and FIG. 4 illustrates a transverse engagement. The lockout clip 200 includes an attachment end 20 having a retaining clip for attaching to outer surfaces 204 of the pushbutton 118 in a locking engagement that prevents the pushbutton 118 from being depressed and engaged. To facilitate attachment and removal, the lockout clip 200 further includes a spring-loaded clip 206 that has a rotating connection to the attachment end 202 and that, in the illustrated embodiment, includes a receptacle for receiving a banner type tag 208, providing a further visual indication to personnel that the pushbutton 118 is locked out and tagged out.

Figure 5A:
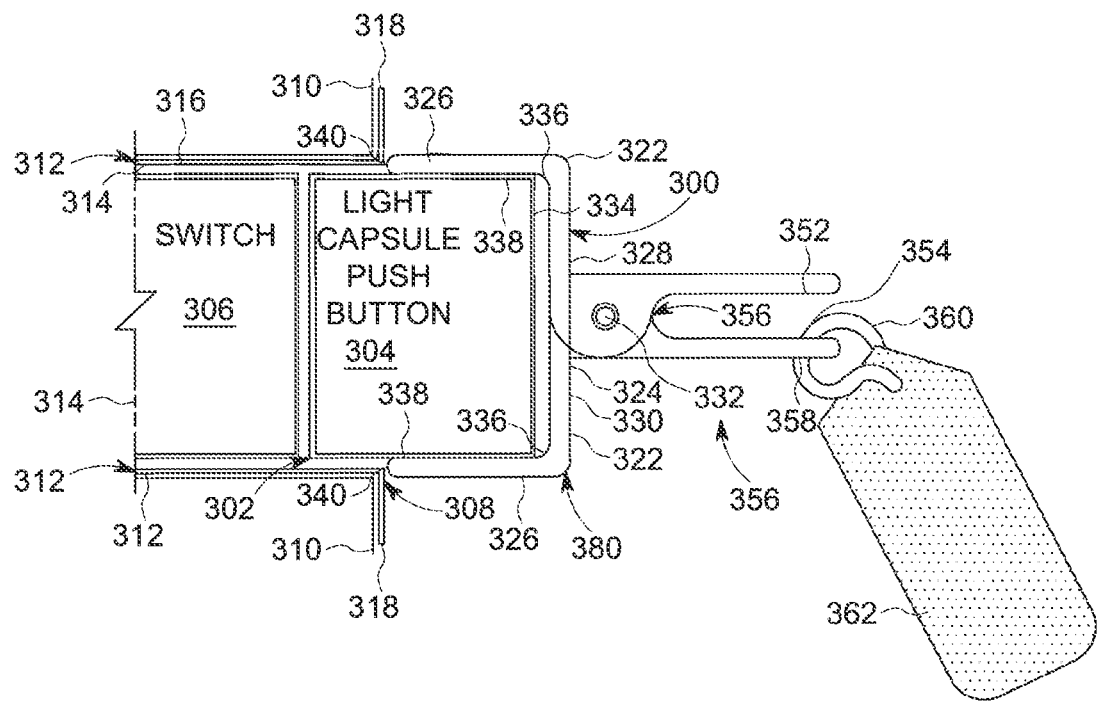
FIG. 5A is a side view of a pushbutton lockout clip in a lockout/tagout position.

FIG. 5A is a cross-sectional view of a pushbutton lockout clip 300 illustrating lockout functionality. In the illustrated embodiment, a pushbutton 302 is a two-part construction, formed of a light capsule pushbutton 304 engaging a depressable switch 306, where the engagement between the two may be through a direct connection maintained at all times, through a spaced engagement where the capsule pushbutton 304 is suspended out of contact with the switch 306 until an operator pushes the former to engage the pushbutton 302, thereby providing direct contact between the pushbutton 302 and the switch 306. In either case, during normal operation, when a pilot or other personnel wants to engage the pushbutton 302, they depress the capsule pushbutton 304, which engages a circuit connected to the switch 306. The light capsule pushbutton 304 may also be configured to display a visual indication upon being depressed, such as a light, an illuminated label, or other indication. In some embodiments, the pushbutton 304 is itself energized by the circuit coupled to the switch 306, such that, upon depression, the pushbutton 304 is energized to provide the visual indication.

In the illustrated embodiment, the switch 306 and the pushbutton 304 are rectangular in shape (from an end-on view, not shown), and in some embodiments, square in shape as with the pushbutton 118 in FIGS. 3 and 4. The pushbutton 304 and the switch 306 may have any number of end on shapes, including circular, elliptical, oval, triangular, and the like.

Figure 5B:
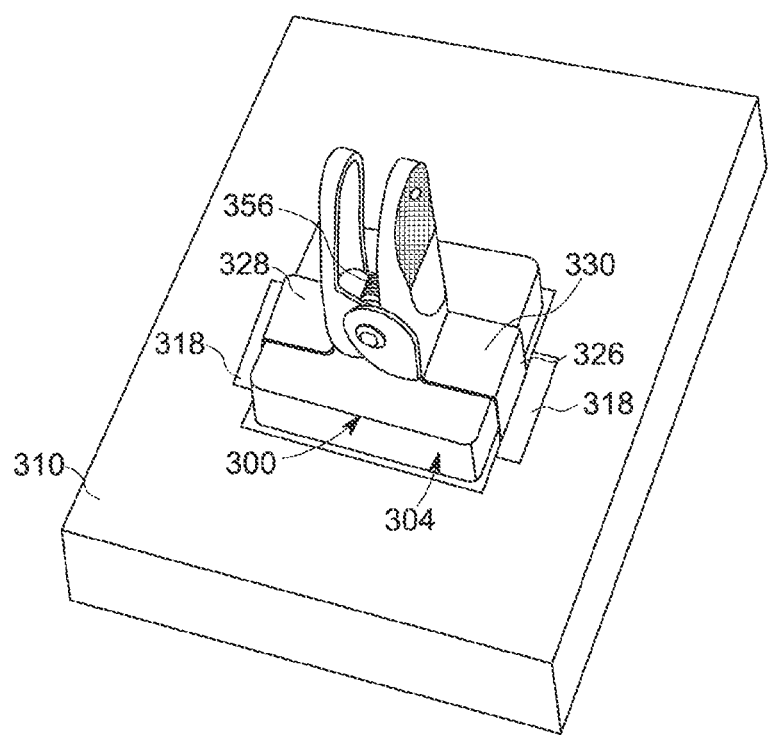
FIG. 5B is a perspective view of the pushbutton lockout clip in lockout/tagout position of FIG. 5A.

The pushbutton 304 is housed within a switch frame 308 designed to fit within a slot of a panel 310, such as a control panel of a flight deck. Switch frame 308 may be formed of a plastic, polyurethane, or other similar material, as would be the illustrated switch 306 and pushbutton 304; while in other embodiments, the switch frame 308 is formed of machinable material such as a metal. In the example of FIG. 5A, the switch frame 308 is shown in cross-section with only two opposing side walls 312. FIG. 5B is a perspective view of the switch frame 308. In other embodiments, the switch frame may have one, two, three, or four sidewalls.

In the illustrated embodiment, the switch frame 308 is formed of side walls 312 having inner surfaces 314 facing the switch 306 and pushbutton 304 and outer surfaces 316 facing interior walls of the slot within the control panel 310. In some embodiments, the side walls 312 are distanced from the switch 306 and the pushbutton 304 to allow the latter to move relative to the former during the depression from personnel. Retaining walls 318 are connected to and extend from the side walls 312, and are flush with a top surface of the control panel 310.

Figure 6:
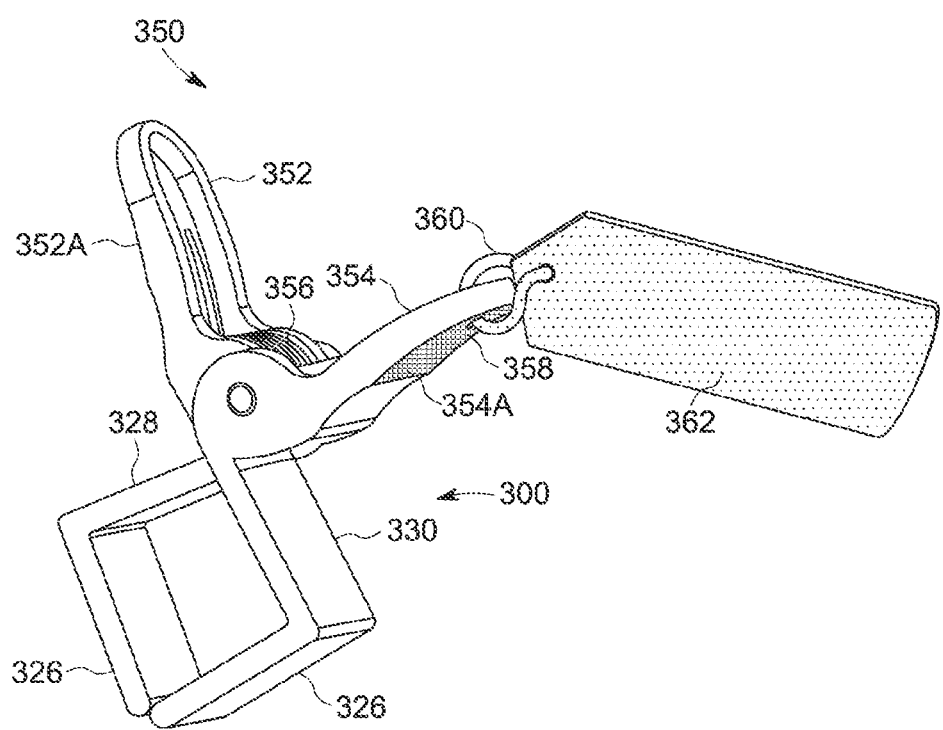
FIG. 6 depicts the pushbutton clip of FIGS. 5A and 5B but in a retracted position.

To prevent either the pushbutton 304 or the switch 306 from engaging during a lockout/tagout, the circuit lockout clip 300 includes attachment end 320 formed with a retaining clamp 322 defining a lockout protection wall 324 extending between opposing engagement walls 326 of the clamp. The lockout protection wall 324 is foldable and contains two segments, a first wall segment 328 and a second wall segment 330. In a lockout/tagout position, the two segments 328 330 are made to rotate respective to one about a pivot 332, to form the lockout protection wall 324 into a planar engagement, where the segments 328 and 330 are coplanar to one another or substantially coplanar to one another. As used herein, the term "substantially" refers to 5% or less variation in the cited value. In the lockout/tagout position, the protection wall 324 extends the entire upper surface 334 of the pushbutton 304, either along a traverse direction (see, e.g., FIG. 3) or a longitudinal direction (see, e.g., FIG. 4). In some embodiments, the lockout protection wall 324 is substantially coplanar, and thus flat, in the lockout/tagout position, and the lockout protection wall 324 is folded, with the wall segments 328 and 330 rotated inward toward each other, in a non-lockout/tagout position. An example non-lockout/tagout position of the lockout clip 300 is shown in FIG. 6.

Figure 7:
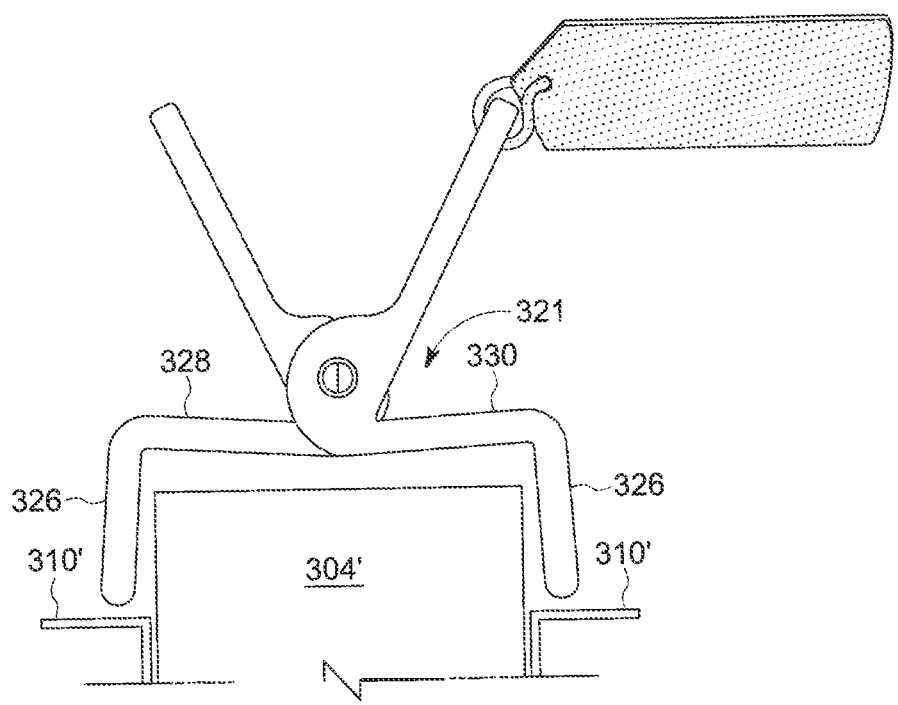
FIG. 7 is a side view of a pushbutton lockout clip in a hyperextended lockout/tagout position.

In some embodiments, the lockout protection wall 324 in the lockout/tagout position has less than a substantially coplanar orientation. In that configuration, the wall segments 328 and 330 are partially rotated toward one another. In certain embodiments, the lockout protection wall 324 in the lockout/tagout position is in a hyperextended state where, from rotation at the pivot 332 or from flexure, the segments 328 and 330 are made to hyperextend beyond the substantially coplanar orientation. An example of this arrangement is depicted by FIG. 7, with lockout clip 300. In the embodiment of FIG. 7, the lockout clip 300 is shown in a lockout/tagout position on a pushbutton 304' similar to pushbutton 304, but slightly larger in width, fitted into a slightly bigger slot in a control panel 310'.

Returning to FIG. 5A, to lockout the pushbutton 304 against depression, the retaining clamp 322 includes opposing engagement walls 336, each configured to clamp respective inner engagement surfaces thereof to outer surfaces 338 of the pushbutton 304. The engagement walls 336 extend from the protection walls 322 a sufficient distance and with a sufficient inwardly directed retaining force to engage the pushbutton 304 and prevent the pushbutton 304 from depressing the switch 306. In particular, the engagement walls 336 have leading edges 340 that extend sufficiently along the length of the outer surfaces 338 to engage or nearly engage the retaining walls 318, thereby preventing any depression (or other downward forces) applied to either the protection wall 322 or the pushbutton 304 from allowing the pushbutton 304 to engage the switch 306 and, in turn, engage the circuit underneath (not shown).

Figure 8:
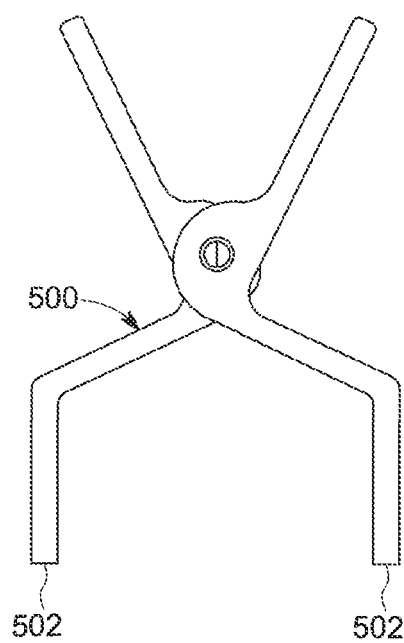
FIG. 8 is an end-on view of a pushbutton lockout clip with right angle leading edges.
Figure 9:
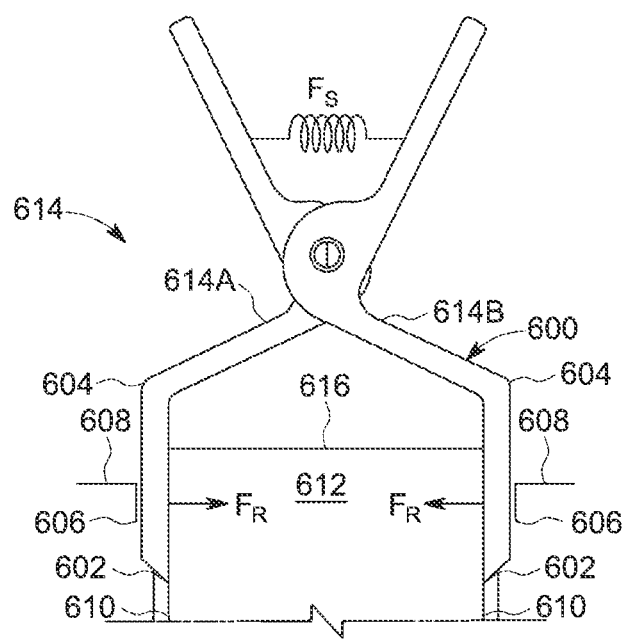
FIG. 9 is an end-on view of a pushbutton lockout clip with beveled leading edges.
Figure 10:
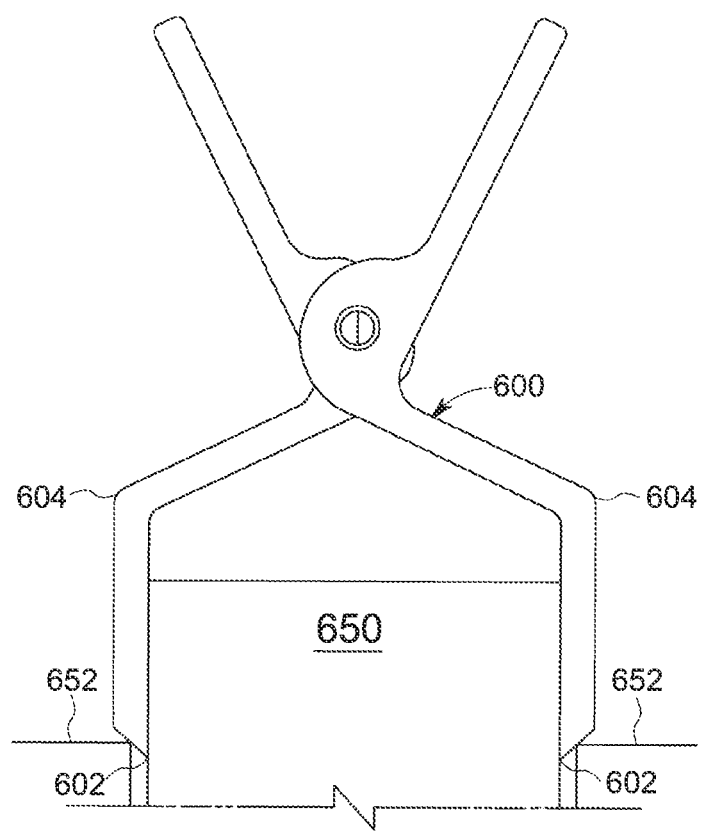
FIG. 10 is an end-on view of a pushbutton lockout clip with beveled leading edges, in accordance with another embodiment of the invention.

The leading edges 340 are shown as curved leading edges, such as terminating in rounded ends. In other embodiments, a lockout clip includes leading edges that are right angle leading edges (see lockout clip 500 with leading edges 502 in FIG. 8). In other embodiments, the leading edges may be beveled leading edges (see lockout clip 600 with leading edges 602 in FIGS. 9 and 10). In certain embodiments, beveling leading edges or other tapered leading edges may be used to provide lockout clips with groove fitting capabilities, in which engagement walls 604 are configured to slide between an inner surface 606 of a switch frame 608 and an outer surface 610 of a pushbutton switch 612. FIGS. 8 and 9 illustrate example configurations. FIG. 10 illustrates the lockout clip 600 in which the beveled leading edges 602 engage and are stopped by a switch frame 652 to lockout a switch 650. Engagement walls 604 can press fit against the outer sidewalls of the switch 650, and the user can ascertain when the lockout clip 600 is fully engaged in the lockout/tagout position, when the beveled edges 602 engage the corners of frame 652. The beveled edges are illustrated herein by way of example, as any number of edge shapes may be used to provide frame engagement for lockout. As with the other features described herein, the varied leading edges can be combined with any other features described herein.

In the illustrated embodiment of FIG. 5A, each engagement wall 326 extends from a protection wall segment 328 or 330 at a substantially 90° angle. In other embodiments, the engagement walls 326 may extend from protection wall segments at an angle less than 90°. These orientations refer to normal positioning of the lockout clip 300, whether in the lockout/tagout or release (also termed non-lockout/tagout or disengaging) position. In some embodiments, the engagement wall 326 and the protection wall segments 328 and 330 are formed of the same material and using a one-piece fabrication process, such that the walls and wall segments have the same stiffness and resistance to flexure. In certain embodiments, the wall and wall segments may be formed of different materials, or one or both may have different coatings or sheathing that adds features such as greater structural rigidity, better tactility for retaining the walls in place, and/or increasing longevity of use. For example, in some implementations, the engagement walls 326 may be coated with a polyurethane or other material to provide increased tactility depending on the surface of the outer surfaces 338. Such coatings may also provide thermal insulation of the engagement walls 326 allowing the engagement walls 326, in some applications, to provide better engagement contact over a larger range of temperatures. Generally speaking, whether coated or not, the engagement walls 326 are configured to maintain engagement with outer surfaces 338 over a range of temperatures from very low ambient temperatures, such as −5° C. and above, to very high contact temperatures, such as 40° C. and above, that may result from thermal heating due to the intensity of light from the light source within the pushbutton 304. The coating may surround the entire engagement wall 326 or may be on an inner engagement surface of wall 326. The coating may be thermally insulating, with a relatively low thermally conductive material.

In the illustrated embodiment of FIG. 5A, the opposing engagement walls 326 have a length that coincides with the length of the inner walls 338 extending above the retaining walls 318. In such a configuration, in the lockout/tagout position, the protection wall 322 is able to contact the upper surface 334 of the pushbutton 304. In yet other embodiments, the length of the engagement walls is greater than the length of the inner walls extending above retaining walls. In the embodiment of FIG. 9, for example, the lockout clip 600 includes a protection wall 604 (formed of segments 614A and 614B) that is suspended above upper surface 616 of the pushbutton 612. In such configurations, as shown in FIG. 9 and FIG. 5A, the protection wall 322 is suspended above the surface 334 out of contact, in the lockout/tagout position.

In order to provide sufficient retention force, $F_R$, as shown in the illustrated example, and accommodate for pushbutton switches in which the length of an outer surface is greater than the depth of the pushbutton extending above a control panel. In the illustrated embodiment of FIG. 5A, the engagement walls 326 have a length that is generally equal to or less than the length of segments 328 and 30. i.e., having a length ratio of 1 or less than 1. In other embodiments, the engagement walls may have lengths greater than the protection walls' segments, as shown in the embodiment of FIG. 9. While a spring is hidden from view in FIG. 9, a spring force, $F_S$, is illustrated by way of example, where it will be understood that $F_S$ maintains the retention forces, $F_R$, in place against the pushbutton 612, as would occur in like fashion for the other example embodiments illustrated herein. Such forces are shown in FIG. 9, but implied in the other embodiments illustrated herein.

The attachment end 320 of the lockout clip 300 may be formed of chrome-plated aluminum, hardened steel, or spring steel. In some embodiments, the attachment end 320 is formed of a resin. In certain examples, the attachment end 320 is anodized. In some embodiments, the attachment end 320 is reflective, such as having a reflective material or label on external surfaces.

In order to control the operation of the lockout clip 300 and movement thereof between a retracted position, as shown in FIG. 6, and a lockout/tagout position as shown in FIGS. 5A, 5B, and 7, the lockout clip 300 includes a spring-loaded clip end 350 formed of two tabs 352 and 354 extending from a spring 356 defining the pivot 332. The tabs 352 have outer surfaces 352A and 354A, respectively, that function as a pinch face for an operator to apply a pinching force, closing a spacing distance between the two tabs to thereby move the lockout clip 300 between positions. In some embodiments, the faces 352A/354A may have a tactile surface for increasing grip, where that surface feature may be a pattern machined or affixed to the tabs or a coating layer bonded to the tabs (see, e.g., FIGS. 3 and 4). In some examples, the tabs 352/354 are shaped as rounded shapes (FIG. 6), or elliptical shapes, or other shapes. The tabs 352/354 may have rounded edges or right angle edges.

In operation, the tabs 352 and 354 will have a maximum spacing distance between them when the lockout clip 300 is in a fully retracted position. The spring-loaded clip end 350 is then configured to rotate the protection wall segments 328 and 330 and the engagement walls 326 until the lockout clip 300 is positioned in place with the pushbutton and thereby positioned in the lockout/tagout position. In some embodiments, the spring-loaded clip end 350 rotates the segments 328 and 330 until the protection wall 322 is substantially planar, and the engagement surfaces 326 are able to slide onto or otherwise pinch down onto outer surfaces of the pushbutton. In certain embodiments, the rotation results in an articulated, non-planar engagement of the protection wall in the lockout/tagout position.

In some embodiments, the spring-loaded clip end 350 is configured to have a minimum spacing distance between the tabs 352 and 354 when the lockout clip 300 is in the lockout/tagout position, as shown in FIGS. 5A and 5B. In certain embodiments, the spring-loaded clip end 350 includes a stopper extending from one or both of the tabs towards the outer tab, and that prevents the tabs from pinching further together when the lockout clip 300 is in the lockout/tagout position. In further embodiments, spring 356 includes a stopper mechanism for preventing further pinching after the lockout/tagout position is entered. The spring 356 may be a spring-engaged hinge pin apparatus.

In some embodiments, the tabs 352 and 354 are rigid against external pressure applied by an operator, thereby only rotating the wall segments and engagement walls of attachment end 320 as a result of the applied operator force on the tabs being converted to rotational force by the spring 356. In other embodiments, the tabs 352 and 354 are flexible against external pressure applied by an operator, such as the force from the operator and the deformation spring force in the tabs is converted to a rotational force by the spring 356 to rotate the attachment end 320. The ratio of lengths of the tabs 352/354 to the length of the segments 328/330 may be 1 or greater, or less than 1.

In some embodiments, the spring-loaded clip end 350 is configured to have spring float when the lockout clip 300 is in a lockout/tagout position. With these embodiments, the tabs 352 and 354 can be pinched further toward each other when the lockout clip 300 is in the lockout/tagout position.

In some embodiments, the cross-sectional material thickness of the tabs 352 and 354 is the same as that of the segments 328 and 330 and the walls 326. In other embodiments, the tabs 352 and 354 have a different thickness from these segments and walls.

In some embodiments, the spring-loaded clip end 350 includes an opening 358 configured to receive an attachment 360 of a lockout tag 362.

The spring-loaded clip end 350 may be formed of the same material as the attachment end 320 or different material. In some embodiments, the spring-loaded clip end 350 is formed of chrome-plated aluminum, hardened steel, or spring steel. In certain embodiments, the spring-loaded clip end 350 is formed of a resin. In other embodiments, the spring-loaded clip end 350 is anodized. In further embodiments, the spring-loaded clip end 350 is reflective. With these embodiments, the spring-loaded clip end 350 has a reflective material label on external surfaces.

Figure 11:
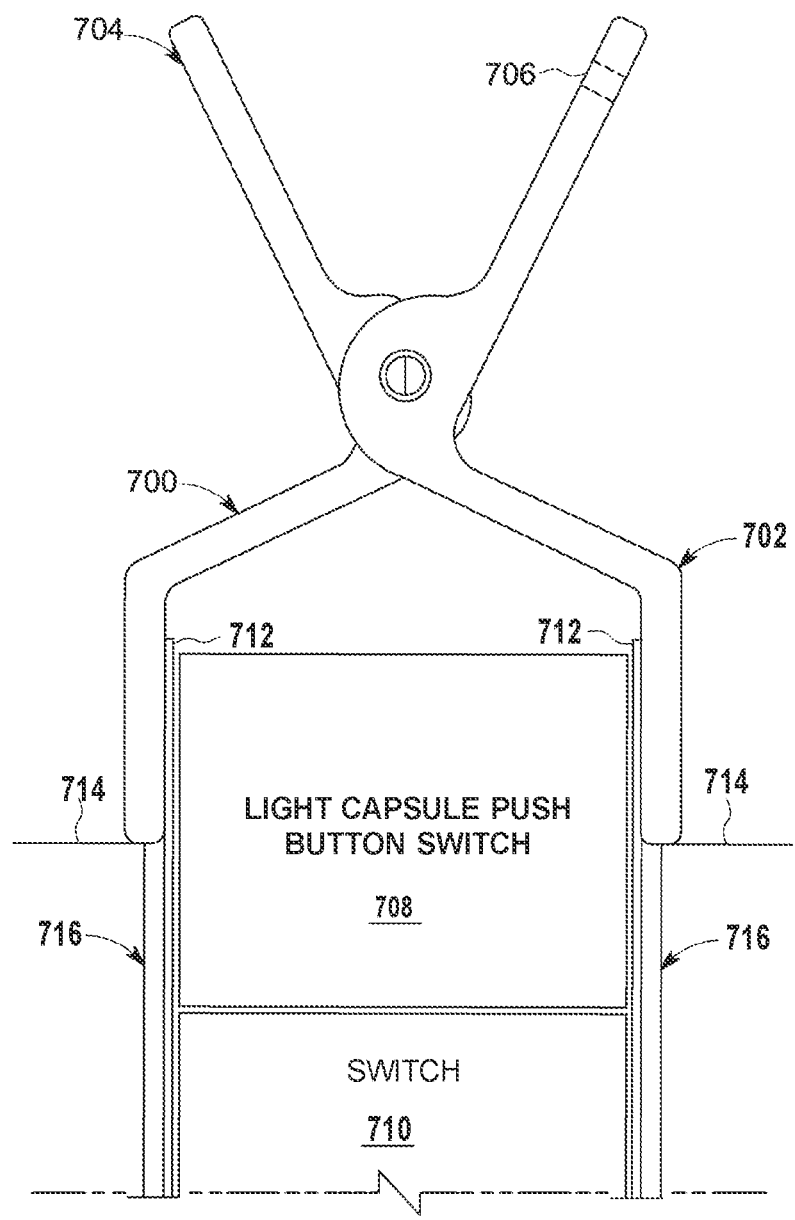
FIG. 11 is an end-on view of a pushbutton lockout clip engaging an outwardly extending frame.

In FIG. 11, there is illustrated an embodiment of a pushbutton lockout clip 700 having an attachment end 702 and a spring-loaded clip end 704 coupled thereto, and having a tag opening 706 for attaching a lockout tag (not shown). In the illustrated embodiment, the lockout clip 700 is shown in the lockout/tagout position, locking out a light capsule/pushbutton 708 and a switch 710 from activation. In the illustrated embodiment, however, instead of the attachment end engaging a switch directly or a pushbutton directly, the attachment end 702 engages a frame 712 of a panel 716 (partially shown). In other embodiments, the top of a frame may be flush with the upper surface of a panel or may be recessed from that upper surface.

Figure 12:
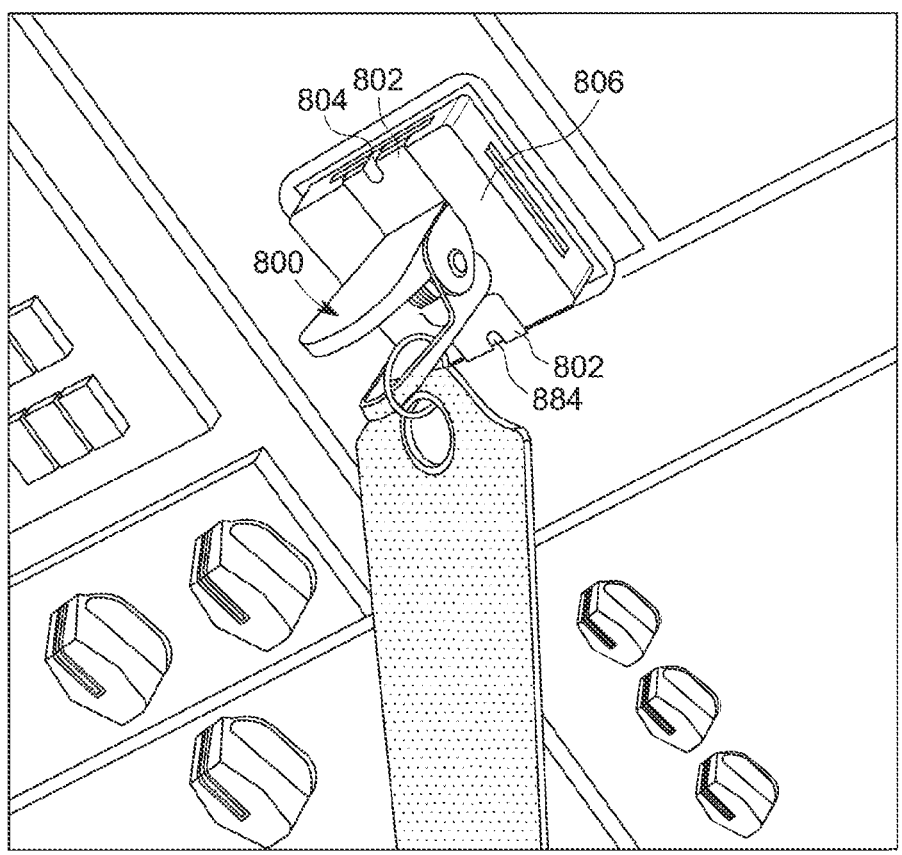
FIG. 12 is a perspective view of a pushbutton lockout clip with a narrow attachment end and a relief slot.
Figure 13:
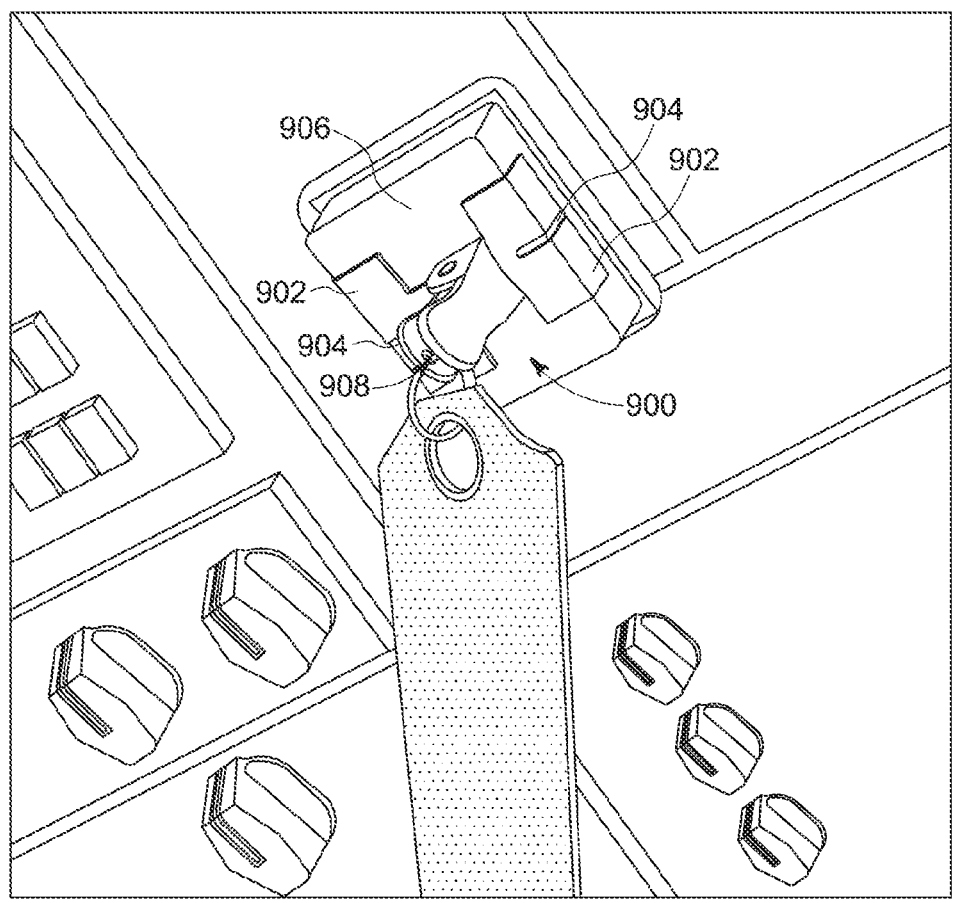
FIG. 13 is a perspective view of a pushbutton lockout clip with a widened attachment end and a relief slot.

FIG. 12 illustrates another embodiment of a pushbutton lockout clip 800 having a narrow attachment end 802 with a relief slot 804 for allowing flexibility to lock different sized pushbuttons 806 and for allowing the clip 800 to be attached in different orientations. FIG. 13 illustrates another example lockout clip 900 having a wider attachment end 902, but also having a relief slot 804 allowing the pushbutton to be attached to lockout different sized pushbuttons 906. In an embodiment, clip 900 may have an attachment end 902 that has 2×, 3×, or greater surface area in comparison to the attachment ends 802 of the lockout clip 800 in FIG. 12. By adjusting the surface area, the amount of deflection force, manifest as inward force pressing against the pushbutton or against a frame, may be reduced. The tension can be increased, however, by increasing the speed tension in the spring-loaded clip end 908. For example, the surface area of the attachment end 902 could be increased 3 times to maintain the same lockout force that an operator would expect for the clip. In the embodiment illustrated by FIG. 12, the spring-loaded clip end tension is increased 3 times. The relief slots may extend from the upper protection walls to the engagement walls. Further, these relief slots may be sized to provide a desired level of relief for allowing greater flex when engaging pushbuttons and frames of different sizes and to adjust the amount of force applied by the lockout clips when engaged in a lockout/tagout position.

Figure 14:
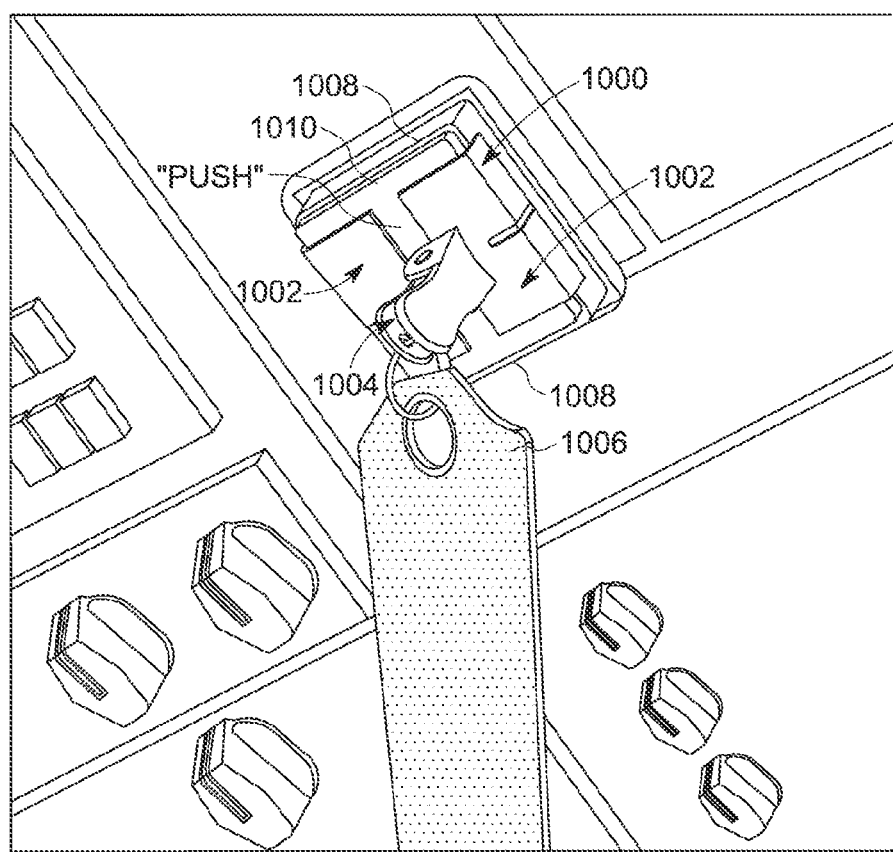
FIG. 14 is a perspective view of another pushbutton lockout clip with a widened attachment end, in accordance with a further embodiment of the invention.

FIG. 14 illustrates an embodiment of a pushbutton lockout clip 1000 having an attachment end 1002 and a spring-loaded clip end 1004 coupled thereto, and having a tag 1006. In the illustrated embodiment, the lockout clip 1000 engages a frame 1008 to lockout a pushbutton 1010 instead of engaging the pushbutton 1010 directly. In the illustrated embodiment, the pushbutton 010 has been depressed, and the light "PUSH" is electrically activated to display to a user. Although the pushbutton 1010 is in this position, the pushbutton is not accessible for activation by a user by virtue of the wideness of the attachment end 1002, which has been sized to prevent a person from inadvertently accessing the pushbutton.

Unless specified otherwise, any of the features or characteristics of any one of the embodiments of the aircraft lockout/tagout clip for pushbutton switches disclosed herein may be combined with the features or characteristics of any other embodiment herein.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention. For example, the ends of the clip can be configured to lock out a wide variety of aircraft controls, such as throttles, flaps, spoilers, toggle switches, control yokes, longitudinal trim control switches, alternate gear extension handles, and the like.

The foregoing description is given for clearness of understanding, and no unnecessary limitations should be understood therefrom, as modifications within the scope of the invention may be apparent to those having ordinary skill in the art. These modifications are intended to fall within the scope of the invention, as defined by the subjoined claims.

What is claimed is:

1. A pushbutton lockout clip for a circuit on an aircraft panel, the circuit having a pushbutton switch for opening and closing the circuit in response to depression of the pushbutton switch, the lockout clip comprising:
   a. an attachment end having a retaining clamp defining a lockout protection wall extending between opposing engagement walls of the clamp, each engagement wall extending from a distal end of the clamp, the opposing engagement walls each being configured to clamp respective inner engagement surfaces to outer surfaces of the pushbutton switch or to outer surfaces of a switch frame surrounding at least a portion of the pushbutton switch, in a lockout/tagout position of the clip; and
   b. a spring-loaded clip end rotatably connected to the attachment end, the spring-loaded clip end configured to rotate the attachment end between a release position and the lockout/tagout position, wherein in the lockout/tagout position, the opposing engagement walls sufficiently cover the outer surfaces of the switch frame or the outer surfaces of the pushbutton switch and contact said switch frame to stop further movement of said pushbutton switch and thereby retain the pushbutton switch against depression.

2. The pushbutton lockout clip of claim 1, wherein the protection wall comprises a first protection wall end and a second protection wall end.

3. The pushbutton lockout clip of claim 2, wherein one of the opposing engagement walls extends from the first protection wall end at a substantially 90° angle and wherein the other of the opposing engagement walls extends from the second protection wall end at a substantially 90° angle.

4. The pushbutton lockout clip of claim 2, wherein one of the opposing engagement walls extends from the first protection wall end at a less than 90° angle and wherein the other of the opposing engagement walls extends from the second protection wall end at less than a 90° angle.

5. The pushbutton lockout clip of claim 2, wherein the spring-loaded clip end is configured to rotate the first protection wall end and the second protection wall end into a planar engagement in the lockout/tagout position.

6. The pushbutton lockout clip of claim 2, wherein the spring-loaded clip end is configured to rotate the first protection wall end and the second protection wall end into an articulated non-planar engagement in the lockout/tagout position.

7. The pushbutton lockout clip of claim 2, wherein the opposing engagement walls have a first length and the first and second protection walls have a second length, wherein the ratio of the first length to the second length is less than 1.

8. The pushbutton lockout clip of claim 1, wherein the attachment end and the spring-loaded clip end are formed of the same material.

9. The pushbutton lockout clip of claim 1, wherein the attachment end and the spring-loaded clip end are formed of a different material.

10. The pushbutton lockout clip of claim 1, wherein the attachment end and the spring-loaded clip end are formed of chrome-plated aluminum, hardened steel, or spring steel.

11. The pushbutton lockout clip of claim 1, wherein the attachment end and the spring-loaded clip end are formed of resin.

12. The pushbutton lockout clip of claim 1, wherein the attachment end and the spring-loaded clip end are anodized.

13. The pushbutton lockout clip of claim 1, wherein the attachment end and the spring-loaded clip end are reflective.

14. The pushbutton lockout clip of claim 1, wherein a material thickness of the attachment end is different than a material thickness of the spring-loaded clip end.

15. The pushbutton lockout clip of claim 1, wherein the attachment end and the spring-loaded clip end are connected by a spring-engaged hinge pin.

16. The pushbutton lockout clip of claim 3, wherein the attachment end comprises a thermally isolating material for the inner engagement surface.

17. The pushbutton lockout clip of claim 1, wherein the opposing engagement walls are configured with a length that abuts the protection wall against an upper surface of the pushbutton switch.

18. The pushbutton lockout clip of claim 1, wherein the opposing engagement walls are configured with a length that suspends the protection wall above an upper surface of the pushbutton switch.

19. The pushbutton lockout clip of claim 1, wherein the opposing engagement walls have a right angle leading edge.

20. The pushbutton lockout clip of claim 1, wherein the opposing engagement walls have a curved leading edge.

21. The pushbutton lockout clip of claim 1, wherein the spring-loaded clip end further comprises a spring stopper engaged when the clip is in the lockout/tagout position.

22. The pushbutton lockout clip of claim 1, wherein the spring-loaded clip end is configured to have a spring float when the clip is in the lockout/tagout position.

23. The pushbutton lockout clip of claim 1, wherein the pushbutton switch is a light capsule pushbutton switch, and the opposing engagement walls are configured to clamp the respective inner engagement surfaces to the outer surfaces of the light capsule pushbutton switch.

24. The pushbutton lockout clip of claim 1, wherein the pushbutton switch comprises a fixed body portion pushbutton, and the opposing engagement walls are configured to clamp the respective inner engagement surfaces to the outer surfaces of the fixed body portion.

25. The pushbutton lockout clip of claim 1, wherein the outer surfaces of the switch frame are flush with an upper surface of the pushbutton switch, and the opposing engagement walls are configured to clamp the respective inner engagement surfaces to the outer surfaces of the switch frame.

26. The pushbutton lockout clip of claim 1, wherein the spring-loaded clip end comprises a receiving opening configured to receive a lockout tag.

27. The pushbutton lockout clip of claim 1, wherein the spring loaded clip end comprises two tabs, each tab having a pinch face and a tactile surface feature on the pinch face.

28. The pushbutton lockout clip of claim 27, wherein the two tabs are rigid against external pressure applied by an operator in the lockout/tagout position.

29. The pushbutton lockout clip of claim 27, wherein the two tabs are flexible against external pressure applied by an operator in the lockout/tagout position.

30. The pushbutton lockout clip of claim 28, wherein the ratio of the length of the two tabs to the length of the lockout protection wall is 1 or greater.

31. The pushbutton lockout clip of claim 29, wherein the ratio of the length of the two tabs to the length of the lockout protection wall is less than 1.

* * * * *